(12) United States Patent
Ghosh et al.

(10) Patent No.: US 8,223,854 B2
(45) Date of Patent: Jul. 17, 2012

(54) METHOD AND APPARATUS FOR TRANSMISSION OF UPLINK CONTROL SIGNALING AND USER DATA IN A SINGLE CARRIER ORTHOGONAL FREQUENCY DIVISION MULTIPLEXING COMMUNICATION SYSTEM

(75) Inventors: Amitava Ghosh, Buffalo Grove, IL (US); Rapeepat Ratasuk, Hoffman Estates, IL (US); Weimin Xiao, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 643 days.

(21) Appl. No.: 11/860,615

(22) Filed: Sep. 25, 2007

(65) Prior Publication Data
US 2008/0165873 A1 Jul. 10, 2008

Related U.S. Application Data

(60) Provisional application No. 60/884,330, filed on Jan. 10, 2007.

(51) Int. Cl.
*H04K 1/10* (2006.01)
(52) U.S. Cl. ......... 375/260; 375/299; 375/347; 375/349
(58) Field of Classification Search .................. 375/260, 375/299, 347, 349
See application file for complete search history.

(56) References Cited

U.S. PATENT DOCUMENTS 6,397,367 B1 5/2002 Park et al.
7,852,814 B2 12/2010 Imamura et al.
2005/0249160 A1 11/2005 Tomita et al.
2006/0126577 A1* 6/2006 Yano et al. ..................... 370/337
2006/0153061 A1* 7/2006 Nishio ........................... 370/208
2006/0215603 A1* 9/2006 Nishio et al. .................. 370/329
2007/0280170 A1 12/2007 Kawasaki

OTHER PUBLICATIONS

3GPP TSG RAN WG1 Meeting #46bis, Seoul, South Korea, Oct. 9-13, 2006, Samsung, Uplink ACK/NACK signaling in support of downlink Hybrid ARQ, R1-062538, pp. 1-8.
3GPP TSG RAN WG1 meeting #46bis, Seoul, Korea, Oct. 9-13, 2006, (Original R1-061674), R1-062740, NTT DoCoMo, Ericsson, Fujitsu, Mitsubishi Electric, NEC, Panasonic, Sharp, Toshiba Corporation, Single-Carrier Based Multiplexing of Uplink L1/L2 Control Channel, pp. 1-9.
3GPP TS 25.211 v6.3.0 (Dec. 2004), 3rd Generation Partnership Project; Technical Specification Group Radio Access Network; Physical channels and mapping of transport channels onto physical channels (FDD) (Release 6), pp. 13-14.
3GPP TS 25.212 v6.4.0 (Mar. 2005), 3rd Generation Partnership Project; Technical Specification Group Radio Access Network; Multiplexing and channel coding (FDD) (Release 6), pp. 67-69.

(Continued)

*Primary Examiner* — Kabir A Timory

(57) ABSTRACT

A user equipment (UE) operating in an Orthogonal Frequency Division Multiplexing communication system transmits Layer 1 and Layer 2 user data non-associated and user data associated control signaling on an uplink by puncturing user data information with the user data non-associated and user data associated control signaling to produce a data stream wherein the control signaling and user data information are multiplexed. The UE then conveys the punctured data stream to a radio access network via an air interface. The communication system further provides for a selection of a coding and modulation for the control signaling based on a modulation and coding scheme of the user data and a transmission scheme that is applied for transmission of the user data information over the air-interface.

20 Claims, 6 Drawing Sheets

OTHER PUBLICATIONS

3GPP TR 25.814 v7.1.0 (Sep. 2006), 3rd Generation Partnership Project; Technical Specification Group Radio Access Network; Physical layer aspects for evolved Universal Terrestrial Radio Access (UTRA) (Release 7), pp. 77-79.

NTT DoCoMo et al.: "Multiplexing Method of Shared Control Channel in Uplink Single-Carrier FDMA Radio Access", TSG-RAN WG1#42bis, R1-051143, San Diego, USA, Oct. 10-16, 2005 (Original R1-050591), all pages.

* cited by examiner

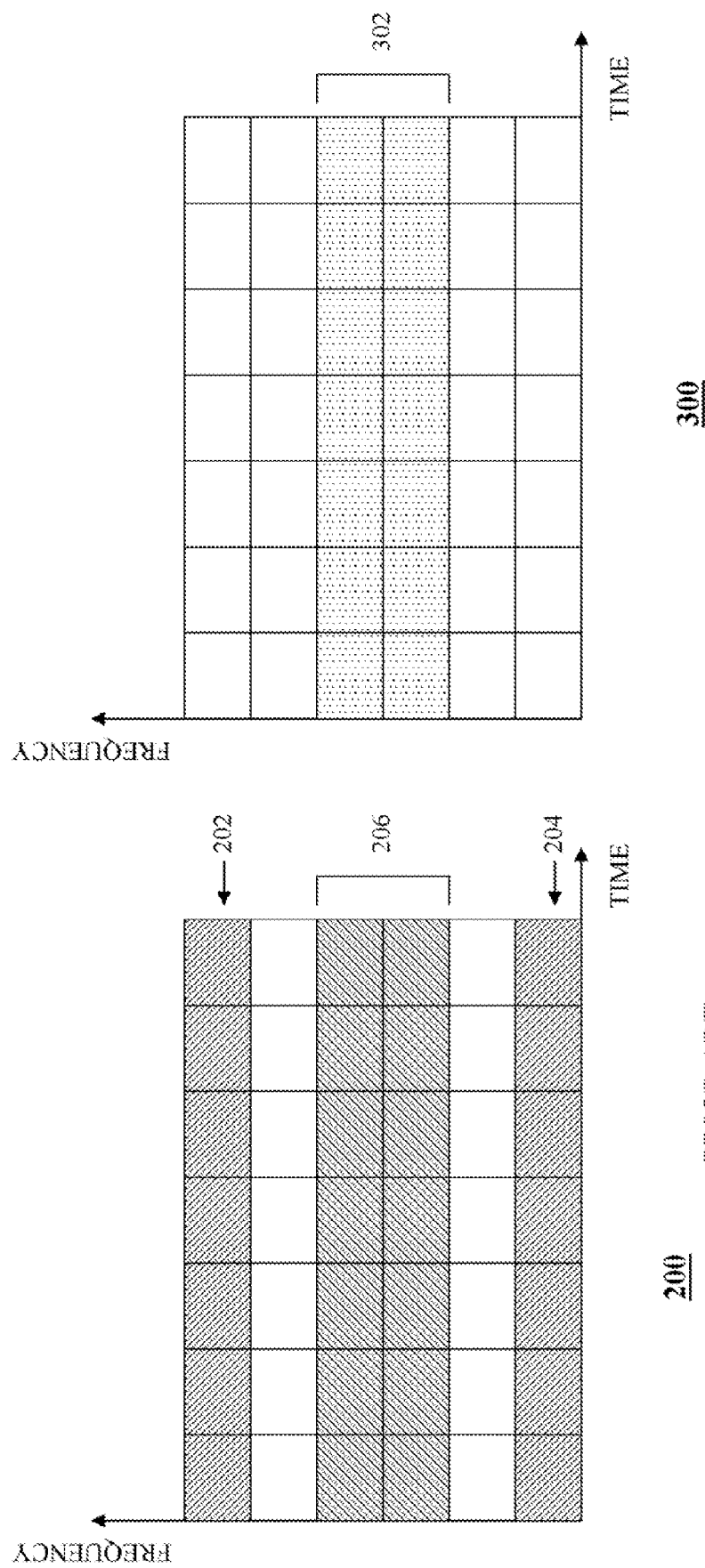

METHOD AND APPARATUS FOR TRANSMISSION OF UPLINK CONTROL SIGNALING AND USER DATA IN A SINGLE CARRIER ORTHOGONAL FREQUENCY DIVISION MULTIPLEXING COMMUNICATION SYSTEM

CROSS-REFERENCE TO RELATED APPLICATION

This application claims priority from provisional application Ser. No. 60/884,330, entitled "METHOD AND APPARATUS FOR TRANSMISSION OF UPLINK CONTROL SIGNALING AND USER DATA IN A SINGLE CARRIER ORTHOGONAL FREQUENCY DIVISION MULTIPLEXING COMMUNICATION SYSTEM," filed Jan. 10, 2007, which is commonly owned and incorporated herein by reference in its entirety.

FIELD OF THE INVENTION

The present invention relates generally to Single Carrier Orthogonal Frequency Division Multiplexing (OFDM) communication systems and, in particular, to transmission of uplink user data and control signaling in a Single Carrier OFDM communication system.

BACKGROUND OF THE INVENTION

A single carrier Discrete Fourier Transform-spread Orthogonal Frequency Division Multiplexing (DFT-SOFDM) modulation scheme has been proposed for uplink transmissions over an air interface in the 3GPP (Third Generation Partnership Project) E-UTRA (Evolved UMTS Terrestrial Radio Access) communication system. In a single carrier DFT-SOFDM communication systems, a frequency bandwidth is split into multiple contiguous frequency sub-bands, or sub-carriers, that are transmitted simultaneously. These sub-carriers are orthogonal to each other. A user may then be assigned one or more of the frequency sub-bands for an exchange of user information, thereby permitting multiple users to transmit simultaneously on the different sub-carriers. Additional sub-carriers are reserved for transmission of control signaling.

In DFT-SOFDM, uplink control signaling may be divided into two categories. A first category, data-associated control signaling, is control signaling that is always transmitted with, and used in the processing, of an uplink user data packet. Examples of this control signaling include transport format, new data indicator, and MIMO parameters. It has been proposed that all uplink transmission parameters be controlled by a Node B since it may be costly to provide reliable control information. With this approach, only the new-data indicator may need to be transmitted by a user equipment (UE) to hybrid automatic repeat request (H-ARQ). In addition, it is to be considered whether the new-data indicator is needed since an acknowledgment (ACK) may be used instead.

A second category of control signaling, that is, control signaling not associated with user data, also known as user data non-associated control signaling, is control signaling that is transmitted independently of an uplink user data packet. Examples of this control signaling include acknowledgments (ACK/NACK), Channel Quality Information (CQI), and Multiple-Input Multiple-Output (MIMO) codeword feedback. In the absence of an uplink data transmission, this control signaling is transmitted in a frequency region reserved for control signaling. In the presence of uplink data transmission, it has been proposed that this control signaling be multiplexed with data. However, no scheme has been proposed for performing such multiplexing. Furthermore, in practice, multiplexing of control signaling with uplink data is difficult due to the different performance requirements between user data and control signaling. In addition, multiplexing is made all the more difficult in that not all non-data associated control fields may be present during a user data transmission. This issue may be somewhat alleviated by scheduling user data transmissions around the non-data associated control signaling. However, this imposes restrictions on the scheduler and may not be practical in many scenarios, for example, with persistence scheduling, re-transmission with synchronous H-ARQ, and for delay sensitive services such as Voice over Internet Protocol (VoIP).

Therefore, a need exists for a method and apparatus that multiplexes user data non-associated control signaling with user data for transmission over an uplink of a single carrier DFT-SOFDM communication system.

BRIEF DESCRIPTION OF THE DRAWINGS

FIG. 2 is an exemplary block diagram depicting a prior art mapping of user data and control data to sub-carriers of an Orthogonal Frequency Division Multiple Access (OFDMA) communication system.

FIG. 3 is an exemplary block diagram depicting a mapping of user data and control data to sub-carriers of an OFDMA communication system in accordance with an embodiment of the present invention.

Figure 1:
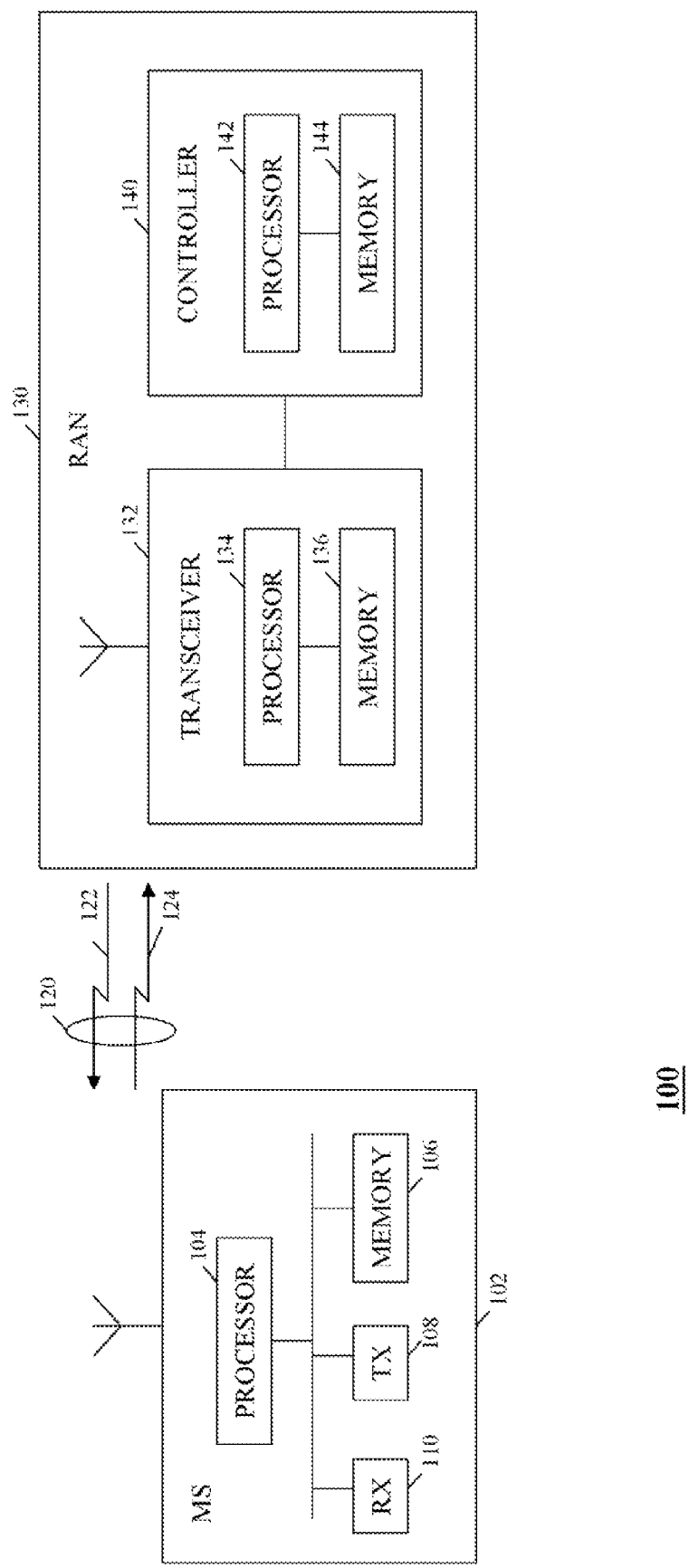
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that multiplexes user data non-associated control signaling with user data for transmission over an uplink of a single carrier Discrete Fourier Transform-spread Orthogonal Frequency Division Multiplexing (DFT-SOFDM) communication system, an Orthogonal Frequency Division Multiplexing (OFDM) communication system is provided wherein a user equipment (UE) transmits Layer 1 and Layer 2 user data non-associated and user data associated control signaling on an uplink by puncturing user data information with the user data non-associated and user data associated control signaling to produce a data stream wherein the control signaling and user data information are multiplexed. The UE then conveys the punctured data stream to a radio access network via an air interface. The communication system further provides for a selection of a coding and modulation for the control signaling based on a modulation and coding scheme of the user data and a transmission scheme that is applied for transmission of the user data information over the air-interface.

Generally, an embodiment of the present invention encompasses a method for transmitting uplink control signaling and uplink user data in an OFDM communication system comprising receiving user data non-associated/data associated control signaling, receiving user data, puncturing the user data non-associated/data associated control signaling into the user data stream to produce a data stream wherein the control and user data information are multiplexed, and conveying the punctured data stream to a radio access network via an air interface.

Another embodiment of the present invention encompasses a UE capable of operating in an OFDM communication system wherein a frequency bandwidth comprises a plurality of frequency sub-carriers. The UE comprises a processor configured to implement a puncturer/insertion module that receives user data non-associated/data associated control signaling, receives user data, and punctures the user data non-associated/data associated control signaling into the user data stream to produce a data stream wherein the control signaling and user data information are multiplexed. The UE further comprises a transmitter coupled to the processor, wherein the processor arranges for a transmission of the punctured data stream via the transmitter and an air interface.

The present invention may be more fully described with reference to FIGS. 1-8. FIG. 1 is a block diagram of a wireless communication system 100 in accordance with an embodiment of the present invention. Communication system 100 includes a user equipment (UE) 102 that is provided wireless communication services by a radio access network (RAN) 130 via an air interface 120. UE 102 may be any type of portable wireless device. For instance, UE 102 may be a cellular telephone, a radiotelephone, a pager, or a Personal Digital Assistant (PDA), personal computer (PC), or laptop computer equipped for wireless communications. Other examples of user equipment are possible. RAN 130 includes a transceiver 132, such as a Node B or a base transceiver station (BTS), coupled to a controller 140, such a radio network controller (RNC) or a base station controller (BSC). Air interface 120 comprises a downlink 122 and an uplink 124. Each of downlink 122 and uplink 124 comprises multiple physical communication channels, including multiple control channels and multiple traffic channels.

Each of UE 102, transceiver 132, and controller 140 includes a respective processor 104, 134, 142 such as one or more microprocessors, microcontrollers, digital signal processors (DSPs), combinations thereof or such other devices known to those having ordinary skill in the art. The particular operations/functions of processors 104, 134, and 142 and respectively thus of UE 102, transceiver 134, and controller 140, are determined by an execution of software instructions and routines that are stored in a respective at least one memory device 106, 136, 144 associated with the processor, such as random access memory (RAM), dynamic random access memory (DRAM), and/or read only memory (ROM) or equivalents thereof, that store data and programs that may be executed by the corresponding processor. UE 102 further comprises at least one transmitter 108 and at least one receiver 110 that are coupled to processor 104 and that provide for transmission and reception of information via air interface 120.

Unless otherwise specified herein, the embodiments of the present invention preferably are implemented within UE 102 and transceiver 132, and more particularly with or in software programs and instructions stored in the respective at least one memory device 106, 136 and executed by the respective processors 104, 134 of the UE and transceiver. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 102 and transceiver 132. Based on the present disclosure, one skilled in the art will be readily capable of producing and implementing such software and/or hardware without undo experimentation.

Communication system 100 comprises a wideband packet data communication system that employs a Single Carrier Orthogonal Frequency Division Multiplexing (OFDM) modulation scheme for transmitting data over air interface 120. Preferably, communication system 100 is an Orthogonal Frequency Division Multiple Access (OFDMA) communication system, wherein a frequency bandwidth is split into multiple frequency sub-carriers that comprise the physical layer channels over which traffic and signaling channels are transmitted in a TDM or TDM/FDM fashion. A user may then be assigned one or more of the frequency sub-carriers for an exchange of bearer information, thereby permitting multiple users to transmit simultaneously on the different set of sub-carriers such that each user's transmission is orthogonal to the other users' transmissions. Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/Hiper-LAN2, 802.11g, or 802.16 standards, or any of multiple proposed ultrawideband (UWB) communication systems.

Communication system further may provide for guaranteed delivery of data packets conveyed over air interface 120, for example, by use of any well known guaranteed-delivery protocol such as an automatic repeat request (ARQ) protocol or a hybrid ARQ (HARQ) protocol. As is known in the art, such protocols use acknowledgments, such as an ACK and/or a NACK, to identify data packets that have been correctly received, erroneously received, or not received.

Communication system 100 selectively schedules each UE operating in the communication system, such as UE 102, for use of one or more sub-carriers of a frequency bandwidth employed by the communication system. In doing so, transceiver 132 provides the UE with a downlink control message, preferably an uplink scheduling grant, via a control channel of downlink 122. The grant includes a UE identifier (UE ID), scheduling information for a scheduling period, an uplink resource assignment, a duration of the assignment, uplink transmission parameters, and an acknowledgment (ACK/NACK) response corresponding to H-ARQ. The UE ID indicates a UE for which the grant is intended. The uplink transmission parameters indicate transmission parameters, such as a modulation scheme, a payload size, Multiple-Input Multiple-Output (MIMO)-related information, and so on, that the identified UE shall use. The scheduling information typically includes a reference start time, preferably in units of radio frames such as a starting Cell System Frame Number (SFN) index or a starting Connection Frame Number (CFN) index, a scheduling duration, that is, a duration of a time period during which the provided scheduling information is applicable, for example, in units of radio frames or Transmission Time Intervals (TTIs), and an allocated uplink resource unit.

In prior art single carrier OFDM communication systems, uplink control signaling is sent over one or more sub-carriers separate from the sub-carriers comprising user data. For example, FIG. 2 is an exemplary block diagram depicting a prior art mapping 200 of sub-carriers of an OFDMA communication system. The vertical axis of FIG. 2 represents frequency and the horizontal axis represents time. As depicted in FIG. 2, control data is conveyed over each of a first set 202 of frequencies and time slots and a second set 204 of frequencies and time slots while user data is sent over a third set 206 of frequencies and time slots separate from the first and second sets of frequencies and time slots. This particular scheme destroys the single carrier property of the OFDM system that results in higher peak-to-average power ratio at the UE, thus reducing its coverage. By contrast, communication system 100 provides for a multiplexing of uplink control signaling, and in particular Layer 1 (L1) and or Layer 2 (L2) user data non-associated and/or user data associated control signaling (hereinafter referred to as 'user data non-associated/data associated control signaling'), with transmitted user data by puncturing the user data with the control signaling, thereby facilitating a transmission of the user data and the user data non-associated/data associated control signaling in a same frequency and time slots. For example, FIG. 3 is an exemplary block diagram depicting a mapping 300 of sub-carriers of an OFDMA communication system in accordance with an embodiment of the present invention. Similar to FIG. 2, the vertical axis of FIG. 3 represents frequency and the horizontal axis represents time. By puncturing user data with user data non-associated/data associated control signaling, the user data and the user data non-associated/data associated control signaling may all be conveyed via a same set of frequencies and time slots 302.

Figure 4:
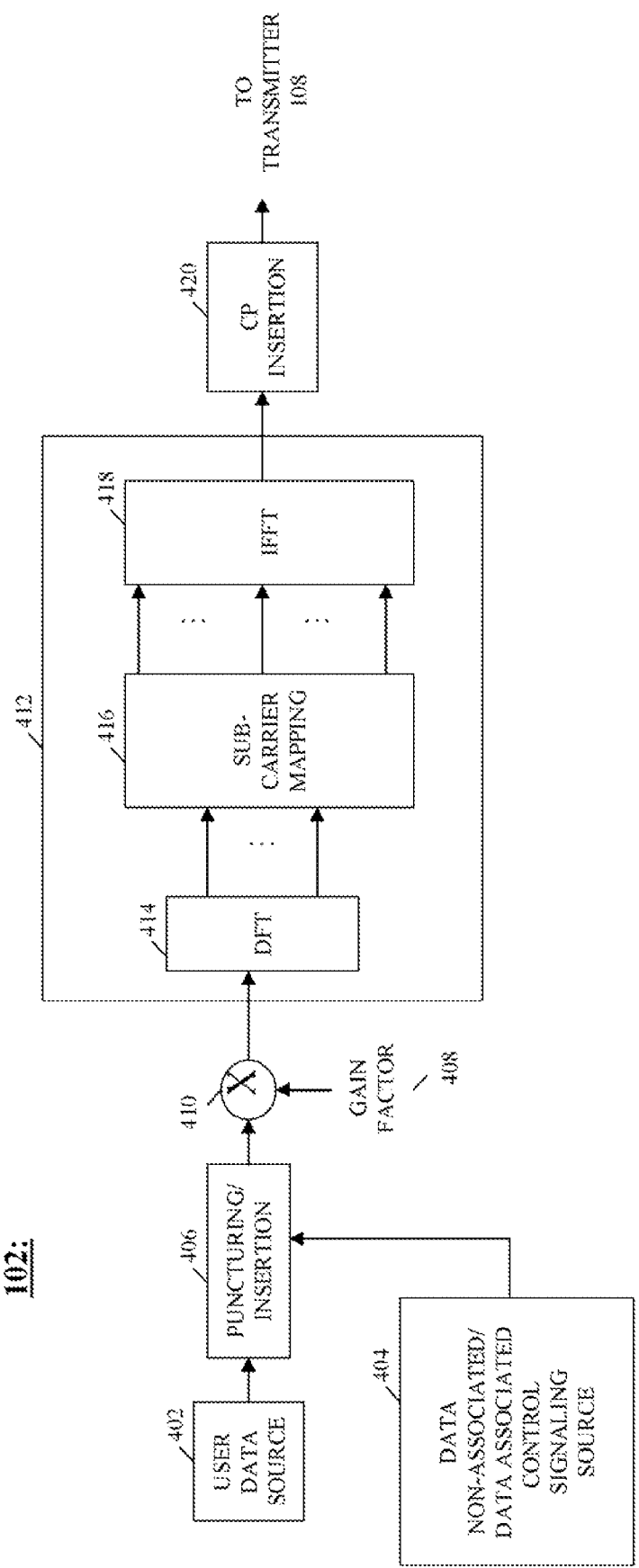
FIG. 4 is a block diagram of an architecture of a user equipment of FIG. 1 in accordance with an embodiment of the present invention.
Figure 5:
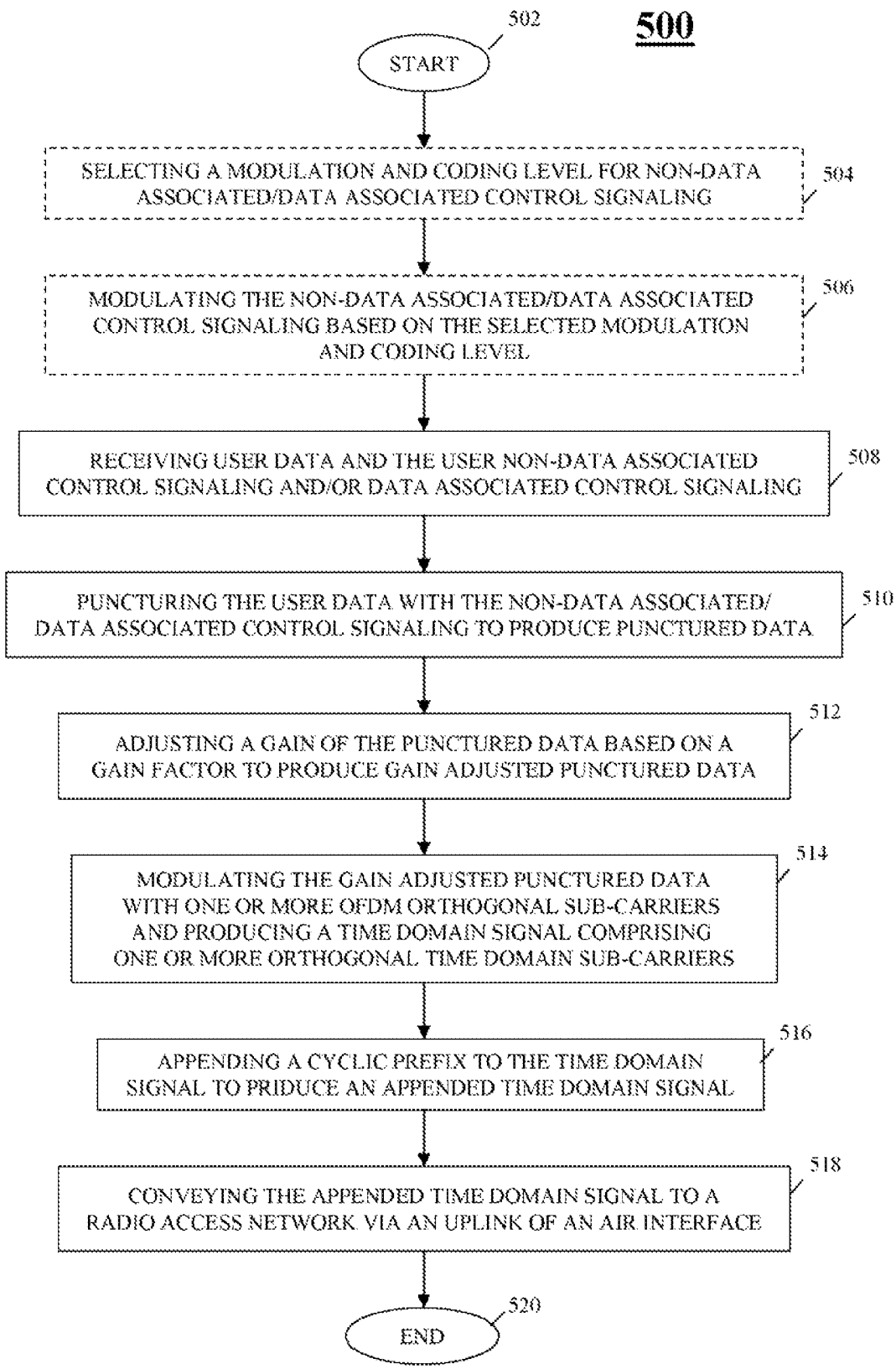
FIG. 5 is a logic flow diagram of a method executed by a user equipment of FIG. 1 in conveying uplink control signaling and user data to a radio access network of FIG. 1 in accordance with an embodiment of the present invention.

Referring now to FIGS. 4 and 5, an operation of UE 102 is described in multiplexing and transmitting uplink user data and control signaling to RAN 130 in accordance with an embodiment of the present invention. FIG. 4 is block diagram of an architecture of UE 102 in accordance with an embodiment of the present invention. Preferably, UE 102 implements a Discrete Fourier Transform-spread Orthogonal Frequency Division Multiplexing (DFT-SOFDM) orthogonal modulation scheme for a transmission of data over uplink 124 of air interface 120. However, one of ordinary skill in the art realizes that UE 102 may implement any OFDM modulation scheme whereby data is modulated onto one or more orthogonal frequency sub-carriers.

UE 102 comprises a user data source 402 and a control signaling source 404 that are each coupled to a puncturing/insertion module 406. User data source 402 provides user data information for transmission over air interface 120 and control signaling source 404 provides both user data non-associated control signaling (control signaling not associated with concurrently transmitted user data, for example, Channel Quality Information (CQI), acknowledgements (ACK/NACK), and Multiple-Input Multiple-Output (MIMO) codeword feedback that are due to downlink transmissions or to scheduling requests for uplink transmissions) and user data associated control signaling (for example, Incremental Redundancy (IR) version, a New Data Indicator, a Transport Format Indicator, etc.). UE 102 further comprises a gain adjuster 410 coupled to the puncturing/insertion module, an orthogonal modulator 412 coupled to the gain adjuster, and a cyclic prefix (CP) insertion module 420 coupled to the orthogonal modulator. Preferably, each of user data source 402, control signaling source 404, puncturing/insertion module 406, gain adjuster 410, orthogonal modulator 412, and CP insertion module 420 is implemented by processor 104 based on programs maintained in the at least one memory device 106; however, the user data source may comprise any source of user data as is known in the art.

FIG. 5 is a logic flow diagram 500 of a method executed by UE 102 in multiplexing and transmitting uplink user data and user data non-associated/data associated control signaling for transmission to RAN 130 in accordance with an embodiment of the present invention. Logic flow diagram 500 begins (502) when user data source 402 and control signaling source 404 respectively source to puncturing/insertion module 406, and the puncturing/insertion module accordingly receives (508), a stream of user data information, preferably in a bit format, and a stream of user data non-associated/data associated control signaling, preferably in a symbol format. Puncturing/insertion module 406 then multiplexes the user data non-associated/data associated control signaling received from control signaling source 404 with the user data received from user data source 402 by converting the user data to a symbol format and then puncturing (510) the user data with the control signaling to produce a stream of punctured data, in a symbol format, wherein the user data and the user data non-associated/data associated control signaling are multiplexed.

In providing the user data non-associated/data associated control signaling to puncturing/insertion module 406, control signaling source 404 may first map the L1/L2 user data non-associated/data associated control signaling into a single codeword or into multiple codewords. Since both control signaling and user data are multiplexed, they are transmitted with the same power. In order to best assure reliable reception of the control signaling, modulation and coding may be appropriately selected for the control signaling. Since the control signaling, that is, control data fields comprising the control signaling, is generally small, codeword mapping may be used to provide additional protection. Subsequent to codeword mapping, repetition (if desired), such as coding performed by repetition blocks 606 and $706_1$-$706_n$ described below, and modulation, such as symbol mapping performed by symbol mappers 608 and 710 described below, selection may be performed according to one or more of information about a condition of uplink 124 and a Modulation and Coding Scheme (MCS) of a data block of user data that that further comprises the control signaling to aid in a decoding of the data block by RAN 130. In addition, the selection of a coding and modulation scheme applied to the control fields also may depend on an uplink user data transmission method or scheme, for example, whether uplink user data is transmitted over air interface 120 using a localized, or distributed, or localized with hopping transmission scheme, such as a localized or distributed Frequency Division Multiple Access (FDMA) transmission method or a localized Frequency Division Multiple Access (L-FDMA) transmission method with frequency hopping. This is because different transmission methods may have different target error rates for a same selected MCS. As a result, a control power requirement relative to the different transmission methods also may be different.

Figure 6:
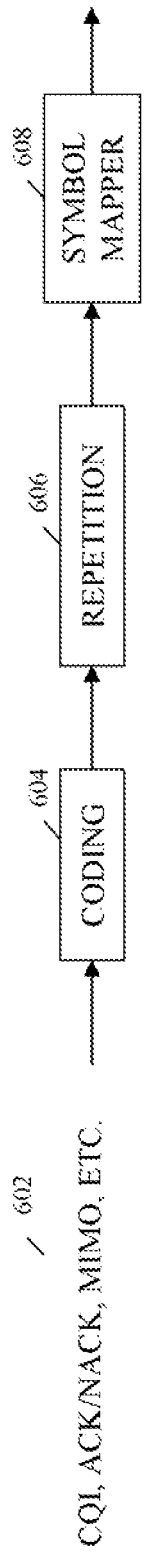
FIG. 6 is a block diagram of a control data source of the user equipment of FIG. 1 in accordance with an embodiment of the present invention.

For example, FIG. 6 is block diagram 600 of an L1/L2 user data non-associated control signaling source, such as control signaling source 404, in accordance with a single codeword embodiment of the present invention. The one or more L1/L2 user data non-associated control signaling comprises multiple control fields, such as CQI information, ACK/NACKs, and MIMO codeword feedback. In the single codeword embodiment, all control fields of the multiple control fields 602, again such as CQI information, ACK/NACKs, and MIMO codeword feedback, are mapped (506) into a single codeword 604, that is, are jointly coded, and are subjected to a single repetition factor 606 to produce a single codeword with redundancy. The codeword is then mapped (506) to a constellation of symbols by a symbol mapper 608 to produce a symbol stream that is routed to puncturing/insertion module 406. Symbol mappers, which map multiple bits to a symbol in a constellation of symbols, are well known in the art and will not be described in detail herein. If all of the control fields are not present, dummy input values may be inserted in place of the control field. This dummy information is known by RAN 130 and is then ignored at the RAN. Alternatively, UE 102 may use any available control fields to transmit some additional information based on an agreed upon methodology. For example, a UE that does not support MIMO may transmit wideband CQI in the MIMO control field. By including dummy data in an empty control field, each codeword is of a same length, which may simplify the multiplexing and de-multiplexing process. However, with this approach it may be difficult to satisfy performance requirements of different control fields, when they differ, and overhead is higher.

Figure 7:
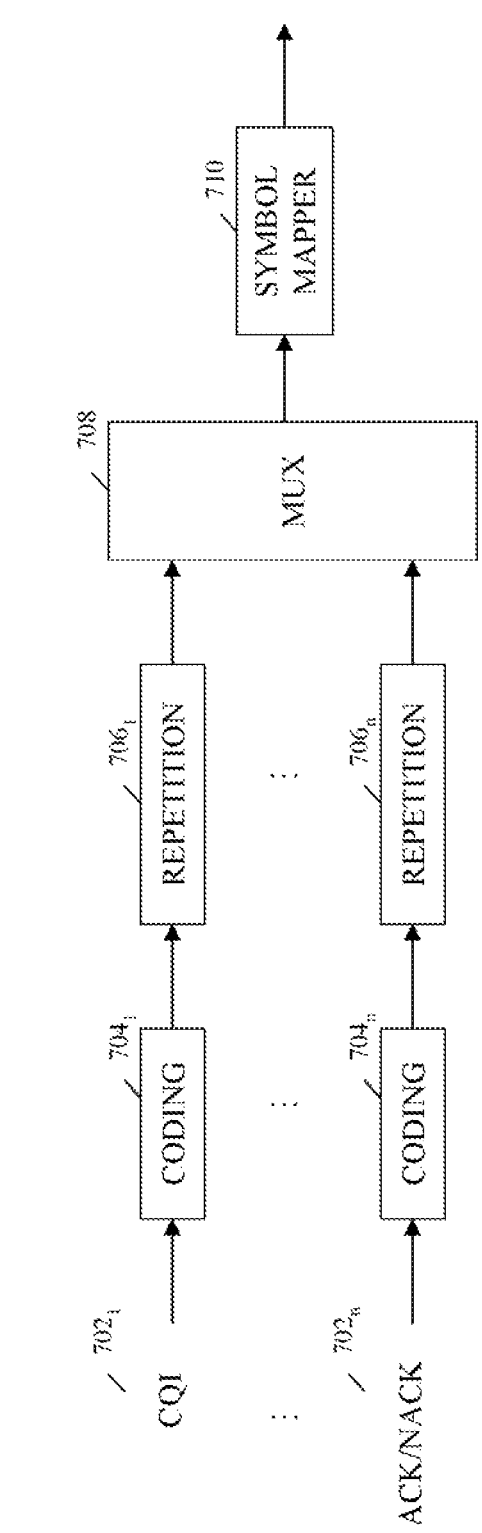
FIG. 7 is a block diagram of a control data source of the user equipment of FIG. 1 in accordance with another embodiment of the present invention.

By way of another example, FIG. 7 is block diagram 700 of an L1/L2 user data non-associated control signaling source, such as control signaling source 404, in accordance with a multiple codeword embodiment of the present invention. In this embodiment, each control field $702_1$-$702_n$ is individually mapped (506) to a corresponding codeword $704_1$-$704_n$ to which is applied its own corresponding repetition factor $706_1$-$706_n$, thereby producing multiple separately coded control fields each with its own redundancy The multiple separately coded control fields, that is, codewords, each corresponding to a control field of the multiple control fields and each with its own redundancy, are then applied to a multiplexer 708, where they are multiplexed to produce a single overall codeword. The overall codeword is then mapped (506) to a constellation of symbols by a symbol mapper 710 to produce a symbol stream that is routed to puncturing/insertion module 406. This allows for individual adjustments of transmission energy using different coding and repetition for each control field so that performance of each control field can be controlled. However, this results in a control portion of transmitted data that is of variable size and which must be compensated for by a rate-matching algorithm.

Since the user data non-associated/data associated control signaling is multiplexed with user data prior to the orthogonal modulator 412, appropriate modulation and coding may be selected (504) for the control signaling for reliable reception. As a result, the amount of coded user data to be punctured may be variable based upon the MCS selected for the control signaling. In this case, rate matching may be performed in one or two steps. With one-step rate matching, a number of bits punctured for insertion of control signaling is factored in when computing the effective coding rate. With two-step rate matching, first the coded data is rate-matched based on the original code rate and subsequently rate-matched again based on a number of bits being punctured. In either approach, it is expected that the same rate matching algorithm can be used.

Figure 8:
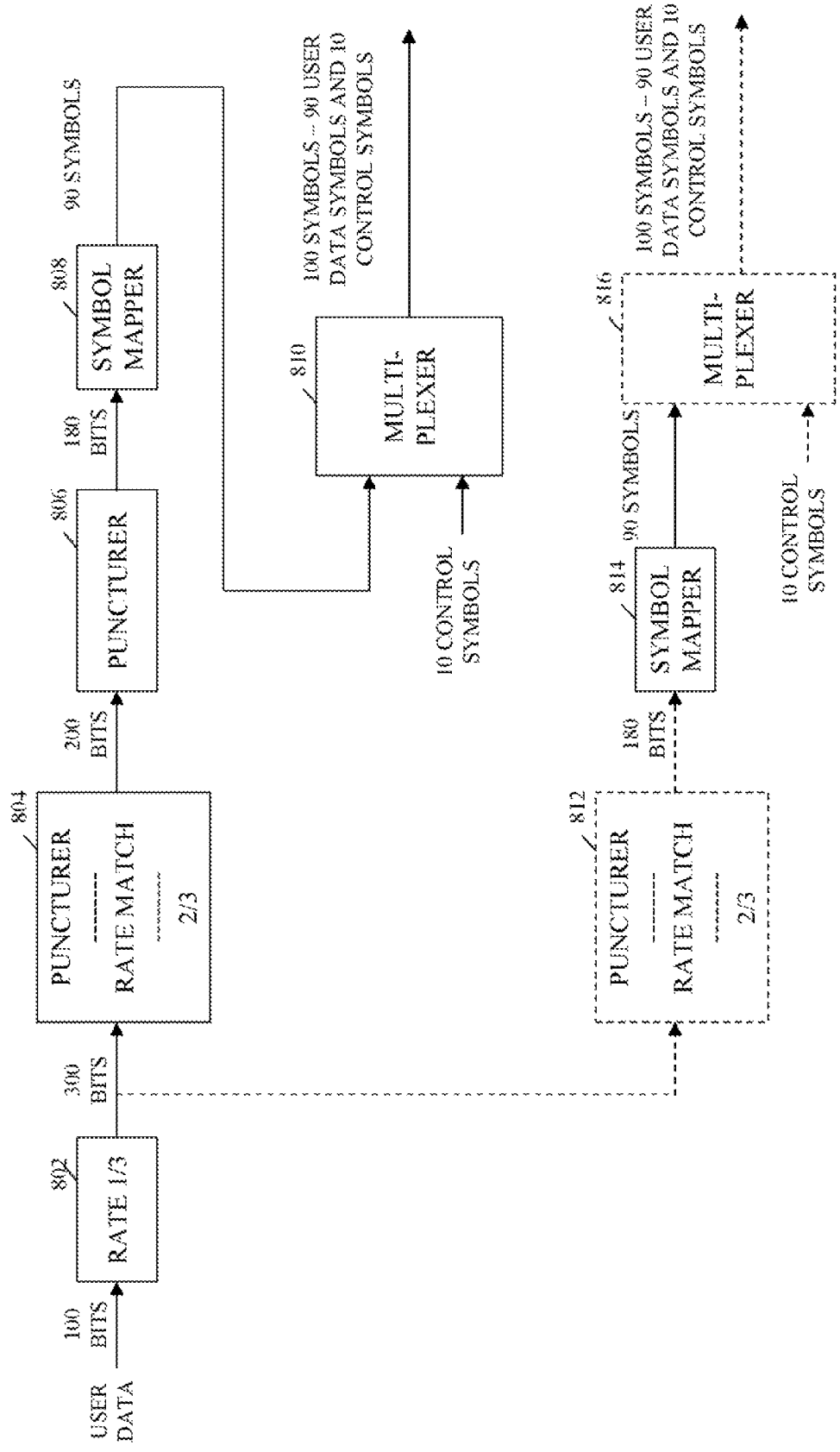
FIG. 8 is a block diagram of an exemplary puncturing/data insertion module in accordance with various embodiments of the present invention.

For example, FIG. 8 is a block diagram 800 of an exemplary puncturing/insertion module, such as puncturing/insertion module 406, in accordance with various embodiments of the present invention. For purposes of illustrating the principles of the present invention and not intending to limit the invention in any way, suppose that 100 bits of user data are applied to puncturing/insertion module 406 and that 20 control bits (for example, 10 symbols with QPSK modulation) are multiplexed with the user data. The 100 bits of user data are applied to a first coder 802 and the first coder adds redundancy to the user data in accordance with a mother coding rate. For example, if a mother Turbo code rate is 1/3, then coder 802 outputs 300 bits for the 100 bits applied to the coder, which 300 bits includes the 100 original bits and 200 parity bits. The 300 bits are then applied to a first puncturer 804, which punctures the data in order to achieve a desired coding rate for over-the-air transmission. For example, if the desired coding rate for the over-the-air transmission is 2/3, puncturer 804 then outputs 200 bits for the 300 bits applied to the puncturer which translates into 100 symbols for QPSK modulation. The 200 bits of user data are then applied to a second puncturer 806. Second puncturer has knowledge of a quantity of control symbols that will be inserted into the data stream output by first puncturer 804 and punctures the data steam to provide for the control symbols. For example, when a QPSK modulation is being used and 10 control symbols are to be punctured into the data stream, second puncturer 806 punctures the 200 bits to produce a bit stream of 180 bits of user data. The 180 bits of user data are then applied to a first symbol mapper 808 that maps the bits to a constellation of symbols to produce a stream of user data symbols. For example, if a QPSK (Quadrature Phase-Shift Keying) digital modulation scheme is used by symbol mapper 808, then the 180 bits of user data may be mapped to 90 symbols. Symbol mapper 808 then conveys the stream of user data symbols to a first multiplexer 810, which multiplexer also receives the control signaling, that is, the 10 control symbols, sourced to the puncturing/insertion module by control signaling source 404. Multiplexer 810 then multiplexes the 90 symbols of user data with the control signaling (that is, the 10 control symbols) to produce a stream of 100 symbols comprising the 90 user data symbols and the 10 control symbols.

Still referring to FIG. 8, in another embodiment of the present invention, a single stage puncturing process may be utilized instead of the two-stage puncturing process described above. In such an embodiment, the 300 bits output by coder 802 are conveyed to a third puncturer 812. Third puncturer 812 has knowledge of a quantity of control symbols that will be inserted into the data stream output by coder 802 and punctures the data steam to provide for the control symbols. Again assuming a desired coding rate for over-the-air transmission of 2/3 and a QPSK digital modulation scheme, third puncturer 812 punctures the 300 bits to produce a bit stream of 180 bits of user data. The 180 bits of user data are then applied to a second symbol mapper 814 that maps the bits to a constellation of symbols to produce a stream of user data symbols. Again, assuming a QPSK digital modulation scheme, symbol mapper 812 maps the 180 bits of user data to 90 symbols. Symbol mapper 814 then conveys the stream of user data symbols to a second multiplexer 816, which multiplexer also receives the control signaling, that is, the 10 control symbols, sourced to the puncturing/insertion module by control signaling source 404. Multiplexer 816 multiplexes the 90 symbols of user data with the control signaling (that is, the 10 control symbols) to produce a stream of 100 symbols comprising the 90 user data symbols and the 10 control symbols.

Referring again to FIGS. 4 and 5, after puncturing the user data, puncturing/insertion module 406 conveys the punctured data (which is in a symbol format) to gain adjuster 410. Gain adjuster 410 adjusts (512) a gain of the punctured data based on a gain factor 408 to produce gain adjusted punctured data, which gain adjusted punctured data comprises a stream of gain adjusted symbols. In various embodiments of the present invention, gain factor 408 is determined by processor 104 based on one or more of a modulation scheme applied to the user data, a coding scheme applied to the user data, a coding rate reduction resulting from the puncturing of the user data with control data, that is, a quantity of user data punctured with control signaling, and a transmission scheme being applied for transmission of the user data over air interface 120. Preferably, UE 102 utilizes a look-up table or an algorithm maintained in at least one memory device 106 of the UE to determine the appropriate gain factor, wherein the gain applied to the punctured data is a function of one or more of the modulation scheme, the coding scheme, the coding rate reduction resulting from the puncturing of the user data with control data, and the transmission scheme being applied for transmission of the user and control data.

For example, if a QPSK (Quadrature Phase-Shift Keying) digital modulation is being used by UE 102 to transmit user data, that is, is applied by symbol mapper 808 or 814, then the gain factor applied to the punctured data may be less than a gain factor applied if a 16-QAM (Quadrature Amplitude Modulation) digital modulation is being used. By way of another example, if UE 102 is utilizes frequency hopping to transmit user data, such as L-FDMA with frequency hopping, then the gain factor may be different than when the UE is not applying frequency hopping to the user data, that is, is transmitting the user data on a single frequency band, as the former instance has the advantage of frequency diversity and a higher forward error rate (FER) target, and therefore may permit a different gain boost.

Gain adjuster 410 then conveys the gain adjusted punctured data, which gain adjusted punctured data comprises a stream of gain adjusted symbols, to orthogonal modulator 412. Orthogonal modulator 412 modulates (514) each symbol received by the orthogonal modulator with an orthogonal frequency domain sub-carrier, such as one of multiple frequency sub-bands in an OFDM communication system, and produces a time domain signal comprising orthogonal time domain sub-carriers.

Preferably, orthogonal modulator 412 comprises a DFT-SOFDM orthogonal modulator having a discrete Fourier transform (DFT) function 414 coupled to a sub-carrier mapping function 416, and an inverse fast Fourier transform (IFFT) 418 coupled to the sub-carrier mapping function. DFT-SOFDM orthogonal modulators are well-known in the art and will not be described in detail except as follows. In response to receiving each symbol, orthogonal modulator 412 routes the received symbol to DFT function 414. DFT function 414 assigns each symbol to a logical sub-carrier number corresponding to one of multiple ('M') orthogonal sub-carriers, that is, frequency sub-bands, in effect converting the symbol stream received from symbol mapper 412 from a serial to a parallel form and producing M parallel symbols, wherein M is the number of sub-carriers contained in a frequency bandwidth allocated for an uplink user data transmission by UE 102. DFT function 414 then applies the M parallel symbols to sub-carrier mapping function 416.

Sub-carrier mapping function 416 then maps each of the M parallel symbols to a to a frequency sub-band, that is, a frequency domain sub-carrier, corresponding to a frequency offset of multiple frequency offsets that are used for user data symbols. IFFT 418 then transforms each symbol of the M parallel symbols, which symbol is assigned to a frequency sub-band, that is, a frequency domain sub-carrier, to a time domain signal, that is, a time domain sub-carrier, thereby producing multiple (M) modulated orthogonal time domain sub-carriers, wherein each sub-carrier corresponds to a sub-carrier included in the frequency bandwidth. That is, the M parallel data streams are provided as input to IFFT 418 and the IFFT outputs M parallel time domain sub-carriers of frequency $f_m$, wherein each sub-carrier of the M parallel sub-carriers is modulated by a corresponding input data stream of the M parallel input data streams. The modulated time domain sub-carriers constituting the IFFT output are converted from a parallel form to a serial form to produce an output signal and the output signal is routed to CP insertion module 420.

CP insertion module 420 appends (516) a guard band interval, or cyclic prefix, to the received time domain signal to produce an appended time domain signal. Processor 104 then conveys, that is, arranges for a transmission of, (518) the appended time domain signal to RAN 130 via transmitter 108 and uplink 124. Logic flow 500 then ends (520). For example, CP insertion module 420 may convey the appended signals to a symbol shaper (not shown). The symbol shaper shapes each signal received from the CP insertion module in accordance with well-known techniques and conveys the shaped signal to an I/Q modulator (not shown). The I/Q modulator produces an in-band (I) signal and a quadrature (Q) signal for each signal received from the symbol shaper and then routes the signals to an upconverter (not shown) of transmitter 108. The upconverter upconverts the signals received from I/Q Modulator from a baseband frequency to a transmit frequency ($f_c$) to produce an upconverted output signal. The upconverted signal is conveyed to a power amplifier (not shown) of transmitter 108, which power amplifier amplifies the upconverted signal and conveys the amplified signal to RAN 130 via uplink 124.

By providing a UE that punctures a stream of user data with Layer 1 and/or Layer 2 user data non-associated and/or user data associated control signaling, communication system 100 produces an uplink data stream wherein the control signaling and user data information are multiplexed and may all be conveyed to a RAN via a same set of frequencies and time slots. This preserves the single carrier property of a single carrier OFDM system and avoids the high peak-to-average power ratio at the UE that results from conveying control signaling in a set of frequencies and time slots different from a set of frequencies and time slots used to convey user data.

Communication system 100 further provides for either a joint coding or a separate coding of multiple Layer 1 and Layer 2 control fields before the control fields are multiplexed with the user data, and for an insertion of dummy data in any empty control fields. By including dummy data in an empty control field, each codeword is of a same length, which may simplify the multiplexing and de-multiplexing process. In addition, since both control signaling and user data are multiplexed, they are transmitted with the same power. In order to assure reliable reception of the control signaling, communication system 100 further provides for a gain adjustment and an appropriate selection of modulation and coding for the control signaling, which modulation and coding selection may be performed according to one or more of information about a condition of the uplink, a Modulation and Coding Scheme (MCS) of a data block of the user data, and an uplink user data transmission method or scheme, for example, whether uplink user data is transmitted over the uplink using a localized, or distributed, or localized with hopping transmission scheme.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having," as used herein, are defined as comprising. The term "coupled," as used herein, is defined as connected, although not necessarily directly, and not necessarily mechanically. An element preceded by ". . . a" does not, without more constraints, preclude the existence of additional identical elements in the process, method, article, or apparatus that the element. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for transmitting uplink control signaling and uplink user data in an Orthogonal Frequency Division Multiplexing communication system comprising:
   receiving one or more of user data non-associated control signaling and user data associated control signaling and wherein receiving the one or more of user data non-associated control signaling and user data associated control signaling comprises separately coding each control field of the plurality of control fields to produce a plurality of separately coded control fields, multiplexing the plurality of separately coded control fields to produce a single codeword and applying a separate repetition factor to each control field of the plurality of separately coded control fields to produce a plurality of separately coded control fields with redundancy;
   receiving user data;
   multiplexing the one or more of user data non-associated control signaling and user data associated control signaling into a user data stream by puncturing the one or more of user data non-associated control signaling and user data associated control signaling onto the user data stream to produce a data stream wherein the one or more of user data non-associated control signaling and user data associated control signaling and user data information are multiplexed and wherein the one or more of user data non-associated control signaling and user data associated control signaling comprises a plurality of control fields and comprising multiplexing the plurality of separately coded control fields with redundancy to produce a single codeword; and
   conveying the data stream to a radio access network via an air interface.

2. The method of claim 1, further comprising adjusting a gain of the data stream wherein the one or more of user data non-associated control signaling and user data associated control signaling and user data information are multiplexed, to produce a gain adjusted data stream and wherein conveying comprises conveying the gain adjusted data stream to a radio access network via an air interface.

3. The method of claim 2, wherein adjusting a gain of the multiplexed data stream comprises adjusting a gain of the data stream wherein the one or more of user data non-associated control signaling and user data associated control signaling and user data information are multiplexed, based on one or more of a modulation scheme applied to the user data, a coding scheme applied to the user data, a coding rate reduction resulting from the multiplexing of the control data into the user data, and a transmission scheme that is applied for transmission of the user data stream over the air interface.

4. The method of claim 1, wherein the one or more of user data non-associated control signaling and user data associated control signaling comprises a plurality of control fields and wherein receiving user data non-associated/data-associated control signaling comprises:
   jointly coding the plurality of control fields to produce a single codeword; and
   receiving the single codeword.

5. The method of claim 4, wherein receiving the single codeword comprises applying a repetition factor to the single codeword to produce the single codeword with redundancy and wherein receiving the single codeword comprises receiving the single codeword with redundancy.

6. The method of claim 4, wherein selection of a coding and modulation of the jointly coded control fields is based on the modulation and coding scheme of the user data and a transmission scheme that is applied for transmission of the user data over the air-interface.

7. The method of claim 6, wherein the transmission scheme for the user data comprises one or more of a localized, distributed, or localized with hopping transmission scheme.

8. The method of claim 1, wherein selection of a coding and modulation of each of the separately coded control fields is based on a modulation and coding scheme of the user data and a transmission scheme that is applied for transmission of the user data over the air-interface.

9. The method of claim 1, wherein the one or more of user data non-associated control signaling and user data associated control signaling comprises HARQ acknowledgement information.

10. A user equipment capable of operating in an Orthogonal Frequency Division Multiplexing communication system wherein a frequency bandwidth comprises a plurality of frequency sub-carriers, the user equipment comprising:
   a processor configured to implement a module that receives one or more of user data non-associated control signaling and user data associated control signaling wherein the one or more of user data non-associated control signaling and user data associated control signaling comprises a plurality of control fields and being received by separately coding each control field of the plurality of control fields and applying a separate repetition factor to each control filed of the plurality of separately coded control fields to produce a plurality of separately coded control fields with redundancy, receives user data, and multiplexes the plurality of separately coded control fields of the one or more of user data non-associated control signaling and user data associated control signaling into a user data stream by puncturing the one or more of user data non-associated control signaling and user data associated control signaling onto the user data stream with redundancy to produce a data stream with a single codeword wherein the one or more of user data non-associated control signaling and user data associated control signaling and user data information are multiplexed; and a transmitter coupled to the processor, wherein the processor arranges for a transmission of the data stream via the transmitter and an air interface.

11. The user equipment of claim 10, wherein the processor is further configured to implement a gain adjuster that adjusts a gain of the data stream wherein the one or more of user data non-associated control signaling and user data associated control signaling and user data information are multiplexed, to produce a gain adjusted data stream and wherein the processor conveys the gain adjusted data stream to the radio access network via the air interface.

12. The user equipment of claim 11, wherein the gain adjuster adjusts a gain of the data stream wherein the one or more of user data non-associated control signaling and user data associated control signaling and user data information are multiplexed, based on one or more of a modulation scheme applied to the user data, a coding scheme applied to the user data, coding rate reduction resulting from the multiplexing of the control data into the user data, and a transmission scheme that is applied for transmission of the user data over the air interface.

13. The user equipment of claim 12, wherein the transmission scheme for the user data comprises one or more of a localized, distributed, or localized with hopping transmission scheme.

14. The user equipment of claim 10, wherein the one or more of user data non-associated control signaling and user data associated control signaling comprises a plurality of control fields and wherein the processor is configured to receive the one or more of user data non-associated control signaling and user data associated control signaling by jointly coding the plurality of control fields to produce a single codeword and receiving the single codeword.

15. The user equipment of claim 14, wherein the processor is further configured to apply a repetition factor to the single codeword to produce the single codeword with redundancy and receive the single codeword by receiving the single codeword with redundancy.

16. The user equipment of claim 14, wherein selection of a coding and modulation of the jointly coded control fields is based on a modulation and coding scheme of the user data and a transmission scheme that is applied for transmission of the user data over the air-interface.

17. The user equipment of claim 16, wherein the transmission scheme for the user data comprises one or more of a localized, distributed, or localized with hopping transmission scheme.

18. The user equipment of claim 10, wherein selection of a coding and modulation of each of the separately coded control fields is based on a modulation and coding scheme of the user data and a transmission scheme that is applied for transmission of the user data over the air-interface.

19. The user equipment of claim 18, wherein the transmission scheme for the user data comprises one or more of a localized, distributed, or localized with hopping transmission scheme.

20. The user equipment of claim 10, wherein the one or more of user data non-associated control signaling and user data associated control signaling comprises HARQ acknowledgement information.

* * * * *